(12) United States Patent
Hayden et al.

(10) Patent No.: US 9,226,034 B1
(45) Date of Patent: Dec. 29, 2015

(54) APPARATUS AND METHODS FOR GENERATING CLIPS USING RECIPES WITH SLICE DEFINITIONS

(75) Inventors: Ben S. Hayden, Somerville, MA (US); Charles Alexander Nelson, Belmont, MA (US); Andrew D. Berkheimer, Boston, MA (US); Prasanna Meda, Santa Clara, CA (US)

(73) Assignee: GOOGLE INC., Mountain View, CA (US)

( * ) Notice: Subject to any disclaimer, the term of this patent is extended or adjusted under 35 U.S.C. 154(b) by 503 days.

(21) Appl. No.: 13/104,631

(22) Filed: May 10, 2011

(51) Int. Cl.
- *H04N 7/173* (2011.01)
- *H04N 21/472* (2011.01)
- *H04N 21/61* (2011.01)
- *H04N 21/81* (2011.01)

(52) U.S. Cl.
CPC ..... *H04N 21/47202* (2013.01); *H04N 7/17318* (2013.01); *H04N 7/17336* (2013.01); *H04N 21/6125* (2013.01); *H04N 21/812* (2013.01)

(58) Field of Classification Search
CPC .............. H04N 21/47202; H04N 21/6125; H04N 21/812; H04N 7/17318; H04N 7/17336
USPC ............... 725/93–94, 115–116, 145–146; 709/203; 386/281
See application file for complete search history.

(56) References Cited

U.S. PATENT DOCUMENTS

| 7,681,113 | B2 | 3/2010 | Takakuwa et al. | |
|---|---|---|---|---|
| 8,224,890 | B1 * | 7/2012 | Marwood et al. | 709/203 |
| 2003/0163815 | A1 * | 8/2003 | Begeja et al. | 725/46 |
| 2003/0233423 | A1 * | 12/2003 | Dilley et al. | 709/214 |
| 2006/0174301 | A1 | 8/2006 | Hashimoto et al. | |
| 2007/0113246 | A1 * | 5/2007 | Xiong | 725/39 |
| 2008/0178219 | A1 | 7/2008 | Grannan | |
| 2008/0276173 | A1 * | 11/2008 | Li et al. | 715/716 |

OTHER PUBLICATIONS

R. Fielding et al., "Hypertext Transfer Protocol—HTTP/1.1", RFC 2616, Jun. 1999, The Internet Society, available at http://www.ietf.org/rfc/rfc2616.txt (last visited May 10, 2011).

Kerrisk, "sendfile—transfer data between file descriptors", Linux Programmer's Manual, Dec. 3, 2010, available at http://www.kernel.org/doc/man-pages/online/pages/man2/sendfile.2.html (last visited May 10, 2011).

The WEBM Project, "webm—an open web media project", 2011, available at http://www.webmproject.org/ (last visited May 10, 2011).

The WEBM Project, "Frequently Asked Questions", 2011, available at http://www.webmproject.org/about/faq/ (last visited May 10, 2011).

Wikimedia Foundation, Inc., "Book cipher", Apr. 13, 2011, available at http://en.wikipedia.org/wiki/Book_cipher (last visited May 10, 2011).

(Continued)

Primary Examiner — Jason Salce
(74) Attorney, Agent, or Firm — Lowenstein Sandler LLP

(57) ABSTRACT

Apparatus and devices are described for generating clips by executing one or more tasks contained in a recipe. The recipe can be received at a server, such as a content server, perhaps as part of a clip request. The server can generate a clip by parsing the recipe. Parsing the recipe can include determining whether a given task of the one or more tasks is a data-source task and, in response to determining that the given task is a data-source task, extracting one or more slices of data from a data source specified in the data-source task and adding the one or more slices to the clip. The data source can include a video data source or a combined video and audio data source. Once generated, the clip can be sent from the server.

29 Claims, 9 Drawing Sheets

(56) References Cited

OTHER PUBLICATIONS

Wikimedia Foundation, Inc., "MPEG-4", Apr. 11, 2011, available at http://en.wikipedia.org/wiki/Mpeg4 (last visited May 10, 2011).
Wikimedia Foundation, Inc., "Cache", May 10, 2011, available at http://en.wikipedia.org/wiki/Cache (last visited May 10, 2011).
Wikimedia Foundation, Inc., "Flash Video", May 1, 2011, available at http://en.wikipedia.org/wiki/Flash_video (last visited May 10, 2011).
Wikimedia Foundation, Inc., "Run-Length Encoding", Feb. 20, 2011, available at http://en.wikipedia.org/wiki/Run-length_encoding (last visited May 10, 2011).
PCS Place, "Create your Own Video Clips Online—Clip Generator", 2010, available at http://pcsplace.com/cool-sites/create-your-own-video-clips-online-clip-generator/ (last visited May 10, 2011).
Apple Inc., "QuickTime File Format Specification Data Management: File Management—Introduction to QuickTime File Format Specification", Aug. 3, 2010, Chapter 1, pp. 15-31, available at http://developer.apple.com/library/mac/documentation/QuickTime/QTFF/qttf.pdf (last visited May 10, 2011).
Apple Inc., "QuickTime File Format Specification Data Management: File Management—Movie Atoms", Aug. 3, 2010, Chapter 2, pp. 33-94, available at http://developer.apple.com/library/mac/documentation/QuickTime/QTFF/qtff.pdf (last visited May 10, 2011).

* cited by examiner

APPARATUS AND METHODS FOR GENERATING CLIPS USING RECIPES WITH SLICE DEFINITIONS

BACKGROUND

Unless otherwise indicated herein, the materials described in this section are not prior art to the claims in this application and are not admitted to be prior art by inclusion in this section.

Various technologies can be utilized to electronically exchange information between users. For example, computers, telephones, and personal digital assistants (PDAs) can be used to exchange content over communication networks including the Internet. The content exchanged between such devices can include text, video data, audio data and/or other types of data. In some scenarios, excerpts of the content can be generated, perhaps to generate other content (e.g., discussion of highlights of a concert or sporting event), a review of the content, education, and for other purposes. Typically, these content excerpts are generated manually, perhaps with the aid of editing tools.

SUMMARY

In one example embodiment, a recipe is received at a server. The recipe can include one or more tasks. The server can generate a clip based on parsing the recipe. Parsing the recipe can include: (i) determining whether a given task of the one or more tasks is a data-source task and (ii) in response to determining that the given task is a data-source task, extracting one or more slices of data from a data source specified in the data-source task and adding the one or more slices to the clip. The clip can then be sent from the server.

In another example embodiment, a clip request is received at a server. The server can generate a recipe for creating the clip. The recipe can include one or more tasks. The one or more tasks can include a data-source task. The data-source task can include a specification of a data source and one or more slice definitions. A request for the clip that includes the recipe can be sent. The clip can be received at the server. The clip can include one or more slices of the data source. Each of the one or more slices can be based on a corresponding slice definition of the one or more slice definitions. A response to the clip request can be sent from the server. The response can include the clip.

The clip can be an excerpt of a data source. The data source can be any type of computer-readable data, such as but not limited to, audio, video, image, textual, software, binary and/or other types of data. In some embodiments, data sources only include audio and/or video data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

In the figures, similar symbols typically identify similar components, unless context dictates otherwise.

DETAILED DESCRIPTION

Overview

Figure 1:
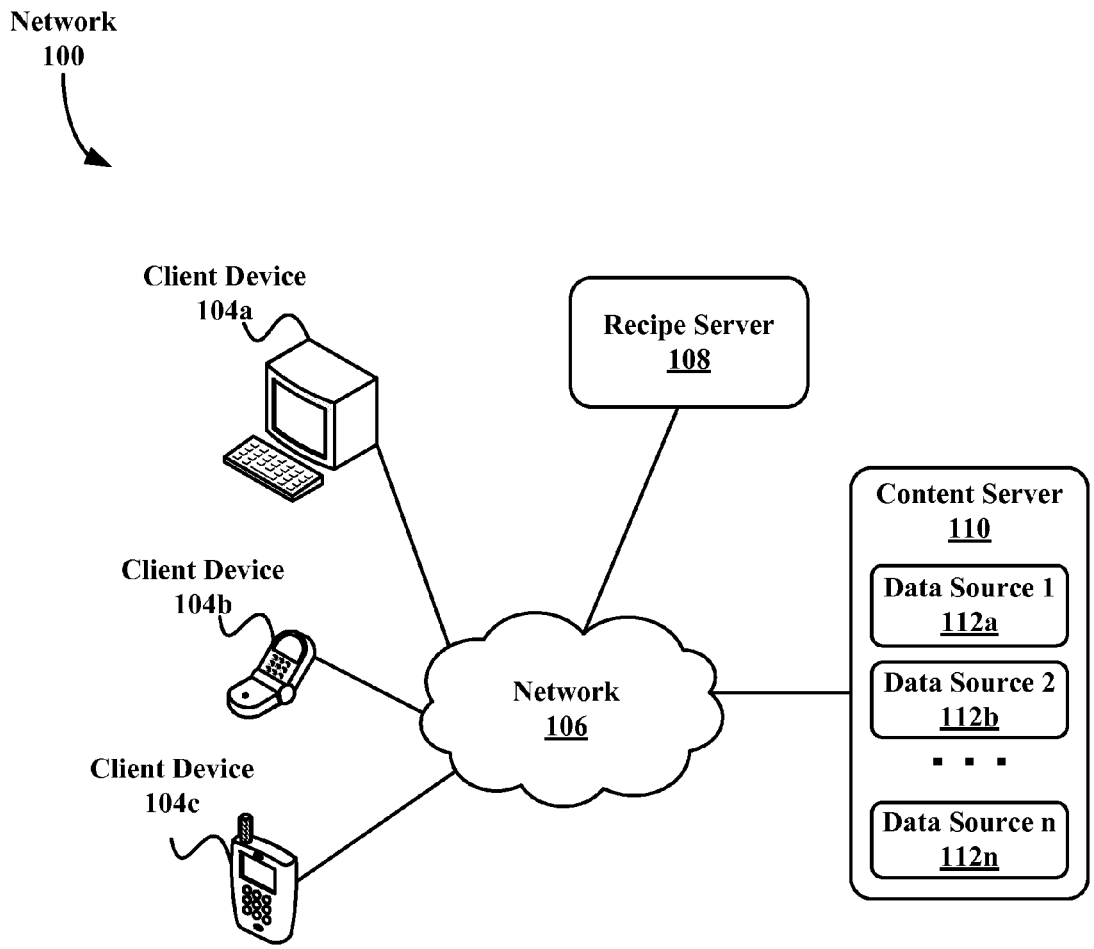
FIG. 1 depicts a network in accordance with an example embodiment.

Example embodiments may involve generation of clips or excerpts of a data source related to a user interacting with a portion of a video stream, such playing a movie. While interacting with the data stream, the user may request to move or seek within the video stream, to some other position or seek point within the video stream, such as skipping to the end of the movie. A clip related to the seek request can be the portion of the movie from the seek point to the end of the movie.

One technique to generate a clip is based on recipes, which can provide collections of instructions related to clips. A server providing clips can execute these instructions, or tasks, in order to generate the clips. For example, one task can be a data source task to insert a slice or part of the video stream (a.k.a. data source) into the clip. An example slice might correspond to the last minute of a movie. Another example task can be a raw bytes task to insert fixed data, such as "Authored by Clifford", into the clip. A third example task can be a dynamic bytes task that inserts data that changes over time into the clip, such as the time that the clip was generated. These recipes can be generated by a computer, such as a recipe server, that receives requests for clips and sends recipes to servers, such as content servers, that generate clips based on the recipes. Once a clip is generated by a content server, the generated clip can be sent to a user to be played on a client device, such as a computer or smart phone.

In some cases, the recipes can be used to improve performance of computer memories that store clips. Most computer memories perform better when data stored in the memory is aligned, or fits within internal boundaries of the memory. For example, suppose a memory of a computer is configured to store data in one megabyte chunks. The performance of this memory is likely to improve if each chunk of the memory can be exactly filled with a one megabyte-sized chunk of data. This improvement occurs because each chunk of data fits precisely into one chunk of the memory, and the memory chunk only stores one item—the chunk. As a result, when an aligned chunk of data is accessed for reading or writing, only the chunk of memory that stores the aligned chunk of data needs to be accessed to carry out the read or write request.

As video streams and other data sources can include large amounts of data, performance of servers providing clips can be improved if the data can be aligned within the memories of these servers. Accordingly, an exemplary embodiment may help align data by generating recipes that define data-source tasks with chunk slices, or slices that address data whose boundaries correspond with chunks of memory in the servers providing clips. Using these "chunk slices" can permit server performance to increase.

In a further exemplary embodiment, consistently addressing slices to be on chunk boundaries permits each chunk can be accessed more often. As the memory in a server is frequently being reused, a least-recently used chunk of memory can be replaced with data that has been more recently used. Therefore, by increasing the number of accesses of a given chunk, the likelihood that the given chunk stays in the memory increases and, at the same time, the likelihood that the memory for the chunk will be replaced with other data decreases. If the chunk is not in memory, the server may have to request that data from another server. Therefore, increasing how often a chunk-aligned slice is used can also increase performance, when multiple accesses of the same video stream or data source occur.

As mentioned above, clips can include slices of data sources. A data source can be any type of computer-readable data, such as but not limited to, audio, video, image, textual, software, binary and/or other types of data. In some embodiments, data sources only include audio and/or video data; in these embodiments, a corresponding clip of a data source can contain part or all of the audio and/or video data in the data source. Data sources can be specified using any suitable addressing scheme, such as, but not limited to, Uniform Resource Locators (URLs), Internet Protocol (IP) addresses, Media Access Control (MAC) layer addresses, memory addresses, and/or local data source (e.g., file) names.

Examples of tasks include "RawBytes" tasks, "DynamicBytes" tasks, and "DataSource" tasks. A RawBytes task can include a specification of one or more bytes of pre-determined data, such as a string of characters, that can be inserted into a clip. A DynamicBytes task can insert data at clip-generation time; for example, a DynamicBytes task could insert a time stamp, source and/or destination identifiers (e.g., IP address(es), domain name(s), URL(s)), and/or other data.

A DataSource task can extract one or more slices from a given data source and insert the extracted slice(s) into the clip. Each slice can include a sequence of data elements (e.g., bits or bytes) from the given data source. The sequence of data elements can be specified using a "slice definition." In some cases, a slice definition has two values: an offset value and a length value. In other cases, the slice definition can specify the corresponding sequence of data elements using other techniques (e.g., specifying indexes of a starting data element and an ending data element).

An example recipe using these three example tasks is shown in Table 1 below:

TABLE 1

```
Recipe {
   RawBytes("ABC"),
   DataSource("http://.../LowercaseEnglishAlphabet", {
      Slice(0, 1),
      Slice(25, 1),
      Slice(4,3)
   },
   DynamicBytes(CUR_HOST)
}
```

In this example recipe, the pre-determined string "ABC" is inserted into a clip using the RawBytes Task. For the example recipe, the "LowercaseEnglishAlphabet" is a data source containing the lowercase English alphabet="abcdefghijklmnopqrstuvwxyz". The first slice of the data source has a slice definition with an offset of "0" and a length of "1." Using zero-based addressing, where the first character in a data source has an offset of 0, the first slice specifies the letter "a". The second slice, with a slice definition with offset 25 and length 1, specifies the character "z". The third slice, with a slice definition with offset 4 and length 3, specifies the string of characters "efg".

A name or other identifier of a current host can be inserted using the DynamicBytes task with the CUR_HOST parameter. More generally, a DynamicBytes task can specify information likely to be unknown to the recipe server. Examples of this information include a time-stamp indicating when the clip was served by the content server to a client device, the host-name used to access the content server (e.g., the CUR_HOST), a flag indicating whether the recipe was already stored on the content server, and/or data and/or information communicated between the content server and client device about software and/or hardware on the client device. Clips generated from a common recipe that has one or more DynamicBytes tasks can be somewhat different from each other.

To generate the example clip, the data is concatenated in the order specified in the recipe, leading to a clip of "ABCazefg" with the current host information appended. Many other recipes, clips, and data sources are possible as well.

The powerful yet terse specification of recipes permits generation of a wide variety of clips without consuming a great deal of storage. Along with clips as described above, recipes can be used to generate "splices", "muxes", and "tweaks."

A splice-type of clip can be generated by concatenating clips from two or more sources into a single new clip. For example, a splice can include advertisements, trailers or other types of media interspersed with in a content stream, such as a movie or musical concert. As another example, suppose a user requested directions along a route. A drive-along preview of the requested route can be generated with a splice-type of clip concatenating a number of video clips taken from driving on the various streets along the requested route. Many other types of splices are possible as well.

Generating a mux-type of clip involves reading a data source containing a single track, and merging the single track into an existing clip. For example, a "karaoke" clip for a song could be a mux with a data source with a video track displaying the lyrics to the song merged into a clip with audio tracks for the song. Many other types of muxes are possible as well.

Tweaks involve generating clips to be displayed on a specific device and/or using specific software. For example, some client devices require that video or audio bit rates that are exact multiples of 8000. A tweak could ensure the bit rate for a given clip conforms to the device displaying the clip. Another example tweak could ensure using file type and/or file names conform to a naming scheme utilized by a specific client device. Yet another example tweak involves ensuring a size of a clip is small enough to fit into a memory of a client device. Many other kinds of tweaks are possible as well.

In some embodiments, another example type of task, a "Continuation" task, can be used to continue or chain together recipes through a call chain. For example, a containing recipe R1 can contain a Continuation task that includes an argument with a path name to a continuation recipe R2. Upon execution of the Continuation task, the content server can load the continuation recipe R2 and execute R2.

Continuation tasks can be used in generating a recipe for a clip when the underlying content is incomplete, therefore preventing the recipe server from generating a recipe for the complete clip. Underlying content can be incomplete in cases where the content is being transcoded (e.g., compressed or decompressed) or the content is incompletely being produced (e.g. live audio or video feed).

A containing task can execute the Continuation task by starting a continuation task to perform the continuation recipe. When the continuation task finishes performing the continuation recipe, control would revert to the containing task. In particular of these embodiments, if the Continuation task is the last task in the containing recipe, then the continuation task may implement "tail-call optimization." Tail-call optimization can include replacing the containing recipe with the continuation recipe, and loop thorough the tasks, starting with the first task, in the continuation recipe. Tail-call optimization can significantly reduce memory usage in situations where the chain of continuation recipes contains several continuations, such as in the case of live video streaming.

Table 2 below shows an example three-recipe continuation chain.

TABLE 2 http://recipe_server/recipe?stream=xyz&fragment=1:
RawBytes("abc1"),
DynamicBytes("CUR_TIME"),
RawBytes("def1"),
DataSource("http://input_data_fragment1.html")
Continuation("http://recipe_server/recipe?stream=xyz&fragment=2")
http://recipe_server/recipe?stream=xyz&fragment=2:
RawBytes("abc2"),
DynamicBytes("CUR_TIME"),
RawBytes("def2"),
DataSource("http://input_data_fragment2.html")
Continuation("http://recipe_server/recipe?stream=xyz&fragment=3")
http://recipe_server/recipe?stream=xyz&fragment=3:
RawBytes("abc3"),
DynamicBytes("CUR_TIME"),
RawBytes("def3"),
DataSource("http://input_data_fragment3.html")

The example continuation chain shown in Table 2 starts with a first recipe http://recipe_server/recipe?stream=xyz&fragment=1, continues with a second recipe http://recipe_server/recipe?stream=xyz&fragment=2, and concludes with a third recipe http://recipe_server/recipe?stream=xyz&fragment=3. Each of the three recipes in Table 2 include two RawBytes tasks, a DynamicBytes task, and a DataSource task.

The first two recipes, http://recipe_server/recipe?stream=xyz&fragment=1 and http://recipe_server/recipe?stream=xyz&fragment=2, also each include a Continuation task that takes the next recipe as an argument. Both of these two recipes have the Continuation task as the last task, therefore making both recipes eligible for tail-call optimization.

The data-source slices can be configured to align on memory-device boundaries. For example, a memory device, such as a cache, can be divided into chunks. For clips whose size exceeds the size of a chunk, the recipe server can generate clips with one or more data-source slices that are aligned with chunk boundaries of the memory device and whose sizes are integer multiples of the chunk size. By specifying chunk-aligned slices, the recipe server can fully utilize storage within each chunk. In combination, chunk-aligned offsets and chunk-aligned length can permit the recipe server to address a data source in chunk-aligned slices, where each chunk starts at a multiple of the chunk size, thereby simplifying addressing.

In some applications, a clip can conform to a "media container" specification for formatting, such as, for example, the ISO/IEC 14496-12:2003 and/or 14496-14:2003 standards, the QuickTime File Format (QTFF) Specification, the Matroska multimedia container format specification, and/or the Advanced System Format (ASF) specification. Other specifications for media containers are possible as well. In other applications, slices may specify regions of interest within a media element, such as watermarks within image, audio, and/or video data. In these other applications, the clip can be scanned for watermarks to aid determination that watermarks are (or are not) present. Many other applications for recipes are possible as well.

The corresponding small sizes of recipes aids in caching clips on content servers and/or on recipe servers. In some implementations, the specification of slices as sequences of data elements can enhance caching performance due to the high spatial locality of the data elements in each slice. Once cached, the clips can be retrieved without re-requesting data in the clip from a network. Thus, oft-requested clips can be provided directly from the cache, reducing both network bandwidth requirements and retrieval time for the oft-requested clips.

An Example Network

Turning to the figures, FIG. 1 depicts a network 100 in accordance with an example embodiment. In FIG. 1, recipe server 108 and content server 110 are configured to communicate, via a network 106, with client devices 104a, 104b, and 104c. As shown in FIG. 1, client devices can include a personal computer 104a, a telephone 104b, and a smart-phone 104c. More generally, the client devices 104a, 104b, and 104c (or any additional client devices) can be any sort of computing device, such as an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Content server 110 can provide content to client device 104a-104c and/or recipe server 108. As shown in FIG. 1, example content can include n data sources, such as data source 1 112a, data source 2 112b, and so on to data source n 112n. While data sources 112a-112n are shown as part of content server 110, content server 110 can provide access to data sources not resident, perhaps by communicating with a computing device via network 106. Each data source 112a-112n can include, but is not limited to, web pages, hypertext, scripts, binary data such as compiled software, images, audio, and/or video. The data source can include compressed and/or uncompressed content and/or encrypted and/or unencrypted content. Other types of data sources are possible as well.

Recipe server 108 can be configured to generate recipes to deliver requested clips of data sources. Alternatively, recipe server 108 and content server 110 can be co-located, and/or can be accessible via a network separate from the network 106. In some embodiments, content server 110 can be an edge server containing a cache. Although FIG. 1 only shows three client devices, recipe server 108 and/or content server 110 can serve hundreds, thousands, or even more client devices.

Example Computing Devices and Computing Network Architectures

Figure 2A:
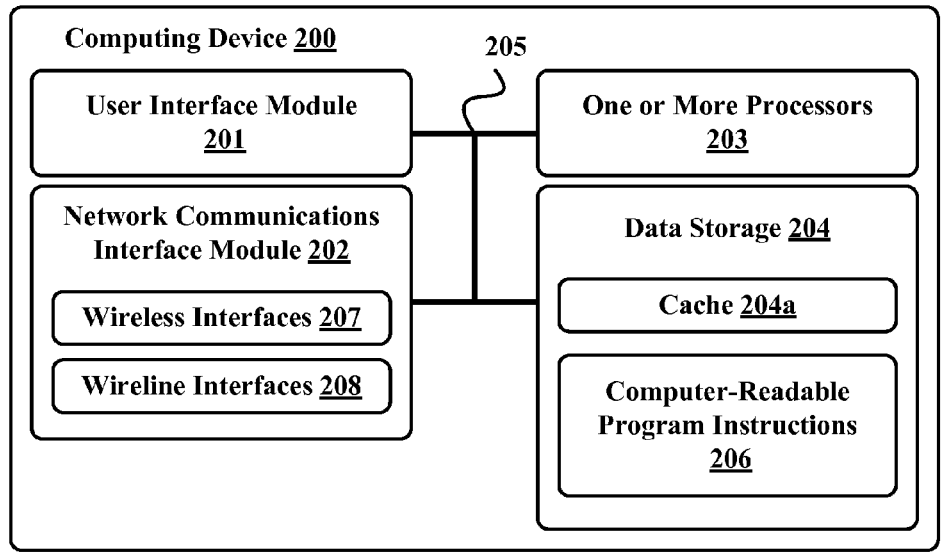
FIG. 2A is a block diagram of a computing device in accordance with an example embodiment.

FIG. 2A is a block diagram of a computing device 200 in accordance with an example embodiment. Computing device 200 can be configured to perform one or more functions of client devices 104a, 104b, and 104c, recipe server 108, content server 110, and/or data sources 112a-112n. The computing device 200 can include a user interface module 201, a network-communication interface module 202, one or more processors 203, and data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices such as a keyboard, a keypad, a touch screen, a computer mouse, a track ball, a joystick, and/or other similar devices, now known or later developed. The user interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to generate audible output(s), such as a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, such as the network 106 shown in FIG. 1. The wireless interfaces 207 can include one or more wireless transceivers, such as a Bluetooth transceiver, a Wi-Fi transceiver perhaps operating in accordance with an IEEE 802.11 standard (e.g., 802.11a, 802.11b, or 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, such as an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some embodiments, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be compressed and decompressed using one or more compression and/or decompression algorithms and/or protocols such as, but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, such as optical, magnetic, organic or other memory or disc storage, which can be integrated in whole or in part with at least one of the one or more processors 203. In some embodiments, the data storage 204 can be implemented using a single physical device (e.g., one optical, magnetic, organic or other memory or disc storage unit), while in other embodiments, the data storage 204 can be implemented using two or more physical devices.

Figure 5:
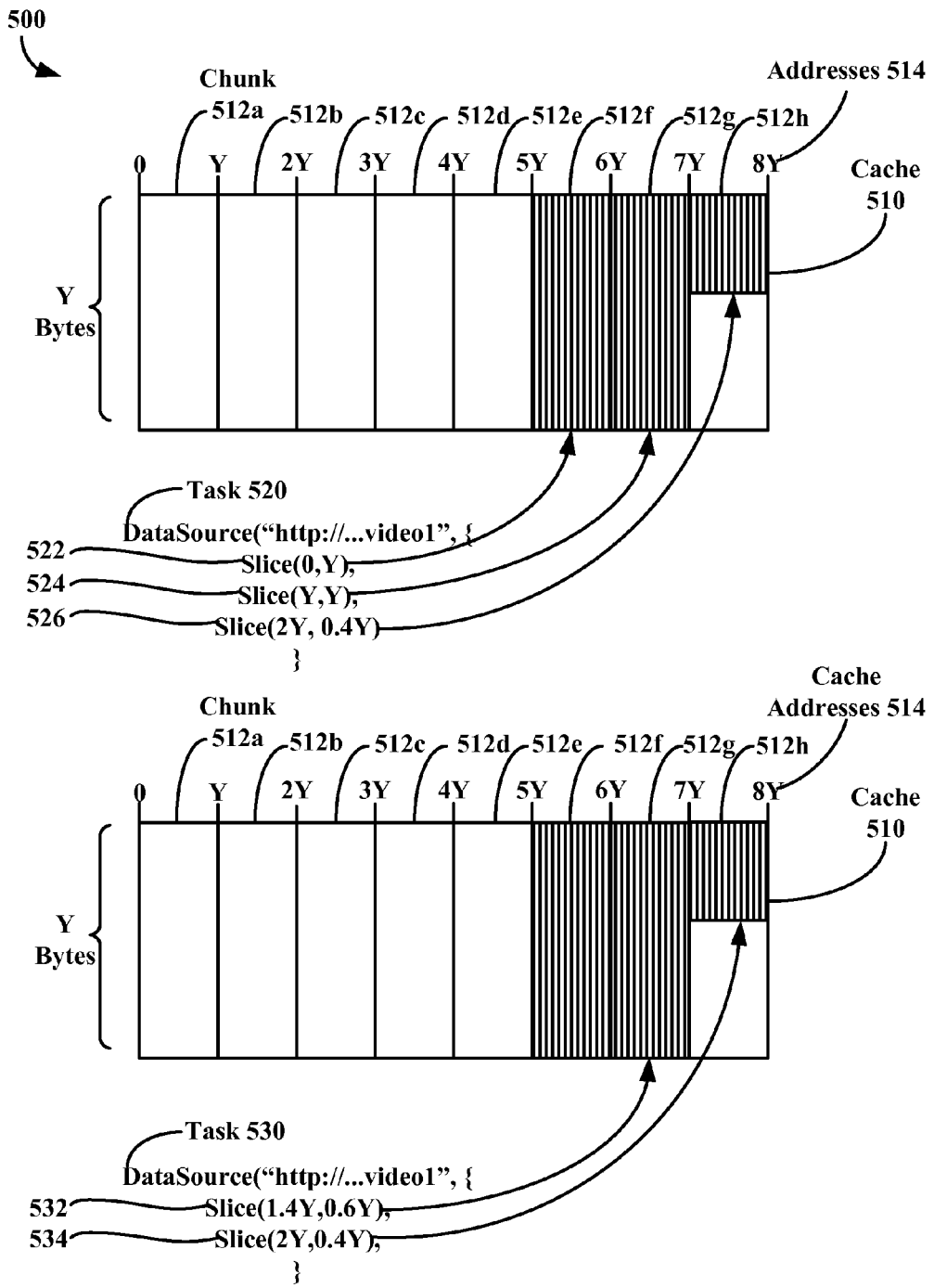
FIG. 5 depicts a scenario for accessing an example cache of a content server in accordance with an example embodiment.

Data storage 204 can include a cache 204a configured to perform at least some of the herein-described techniques of a cache. In some embodiments, storage in data storage 204 and/or cache 204a can be divided into "chunks" as described herein. For example, cache 204a can have X bytes of data divided into a number N of equally-sized chunks with each chunk having a size of Y bytes; example values of X and Y are 8 gigabytes (8,589,934,592 bytes) and 2 megabytes (2,097,152 bytes), with a corresponding value of N=4,096 chunks. Another example cache where N=8 is depicted in FIG. 5, and discussed below. Many other example values of X and Y are possible as well.

In particular embodiments, part or all of one or more data sources are stored in chunk-sized blocks of a cache. Using the example two-megabyte-chunk-sized cache mentioned above, a 9 megabyte data source DS9 could be divided into five slices: four full chunk-aligned slices, each containing two megabytes of DS9, and a fifth non-full slice storing one megabyte of DS9.

In other embodiments not shown in FIG. 2A, cache 204a can be divided into two or more sub-caches. For example, one or more sub-caches can store data, such as content, while other sub-cache(s) can store instructions, such as recipes and/or computer-readable program instructions. In particular embodiments, a recipe cache (or sub-cache) can store one or more recipes and a content cache (or sub-cache) can store content related to at least one recipe.

Computer-readable storage media associated with data storage 204 and/or other computer-readable media described herein can also include non-transitory computer-readable media such as computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, such as secondary or persistent long term storage, like read only memory (ROM), optical or magnetic disks, compact-disc read only memory (CD-ROM), for example.

Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some embodiments, the data storage 204 can additionally include storage required to perform at least part of the herein-described techniques, methods (e.g., methods 600 and/or 700), and/or at least part of the functionality of the herein-described devices and networks.

Figure 2B:
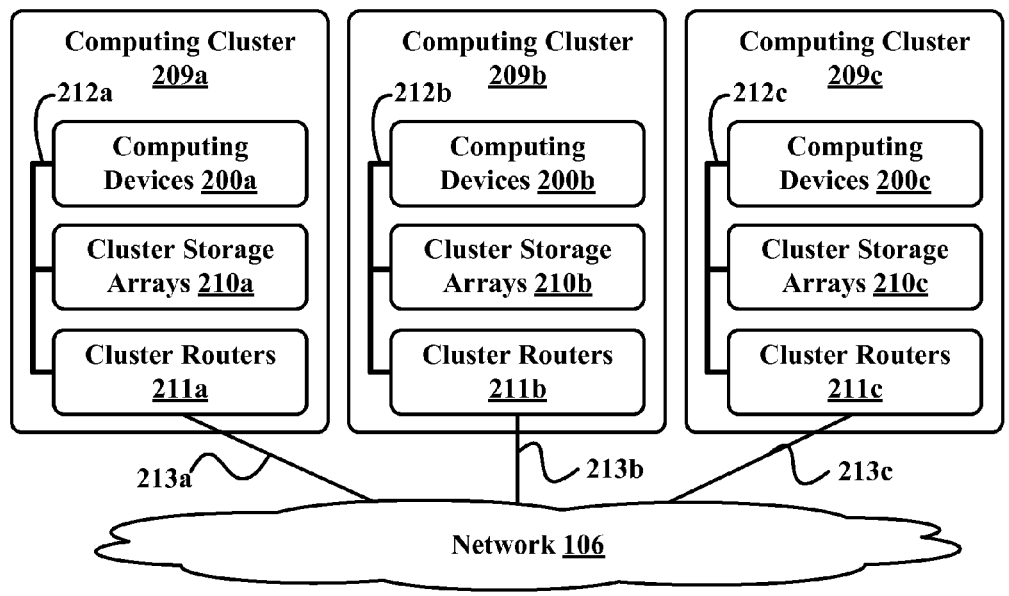
FIG. 2B depicts a network with computing clusters in accordance with an example embodiment.

FIG. 2B depicts a network 106 with computing clusters 209a, 209b, and 209c in accordance with an example embodiment. In FIG. 2B, functions of content server 110 and/or recipe server 108 can be distributed among three computing clusters 209a, 209b, and 208c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b, and cluster routers 211b connected by local cluster network 212b. Likewise, computing cluster 209c can include one or more computing devices 200c, cluster storage arrays 210c, and cluster routers 211c connected by a local cluster network 212c.

In some embodiments, each of computing clusters 209a, 209b, and 209c can have an equal number of computing devices, an equal number of cluster storage arrays, and an equal number of cluster routers. In other embodiments, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of content server 110. In one embodiment, the various functionalities of content server 110 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with recipe server 108. Computing devices 200b and 200c in computing clusters 209b and 209c can be configured the same or similarly to the computing devices 200a in computing cluster 209a.

On the other hand, in some embodiments, computing devices 200a, 200b, and 200c each can be configured to perform different functions. For example, computing devices 200a and 200b can be configured to perform one or more functions of content server 110, and the computing devices 200c can be configured to perform one or more functions of recipe server 108.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of recipe server 108 and/or content server 110 can be distributed across computing devices 200a, 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for content server 110, while other cluster storage arrays can store data for recipe server 108. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211 c can include network equipment similar to the cluster routers 211a, and the cluster routers 211b and 211c can perform similar networking functions for the computing clusters 209b and 209b that the cluster routers 211a perform for the computing cluster 209a.

In some embodiments, computing tasks and stored data associated with recipe server 108 and/or content server 110 can be distributed across the computing devices 200a, 200b, and 200c based at least in part on the processing requirements for functions of recipe server 108 and/or content server 110, the processing capabilities of the computing devices 200a, 200b, and 200c, the latency of the local cluster networks 212a, 212b, and 212c, the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

Example Communications for Clip Delivery

Figure 3A:
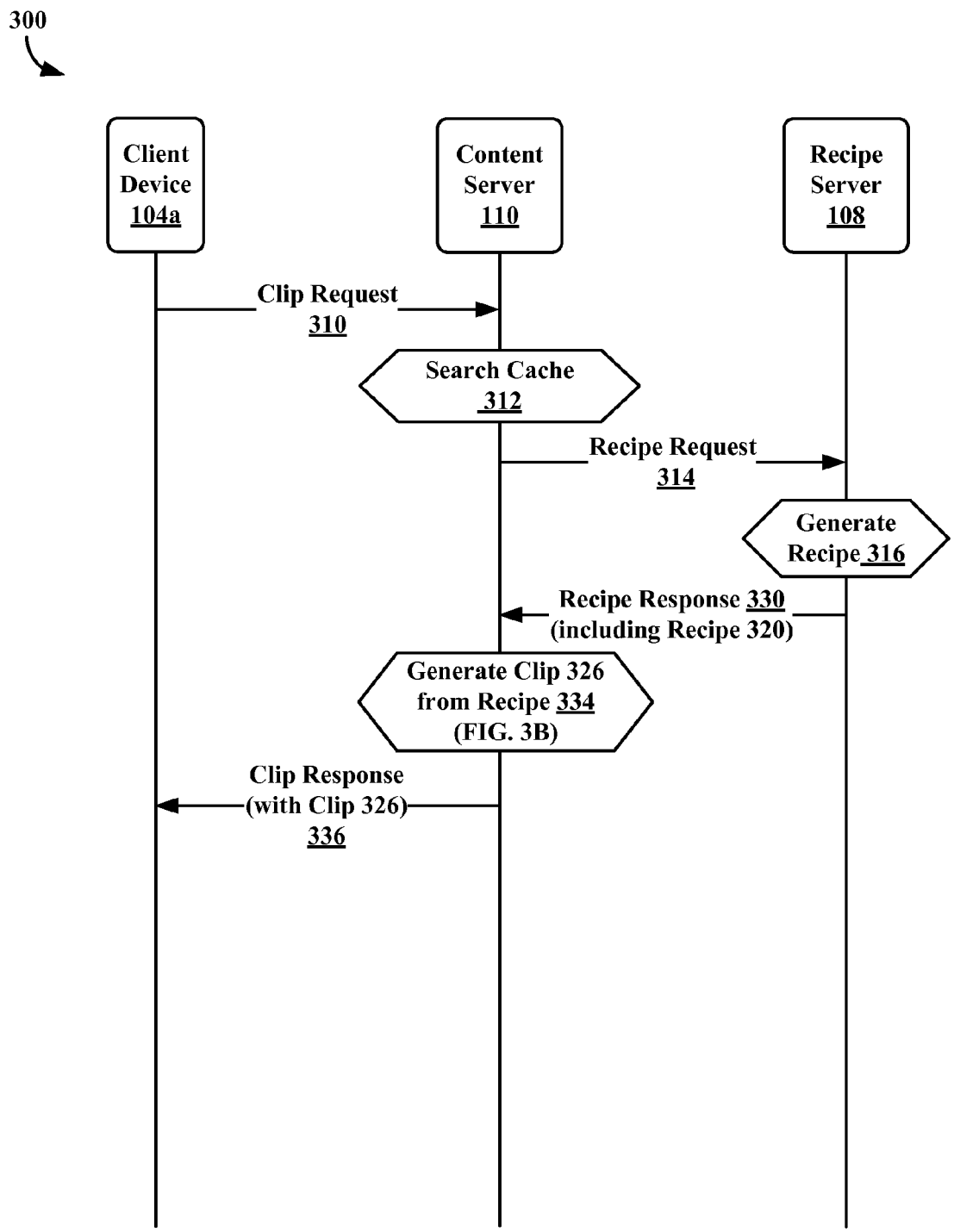
FIGS. 3A and 3B together depict a scenario in accordance with an example embodiment.
Figure 3B:
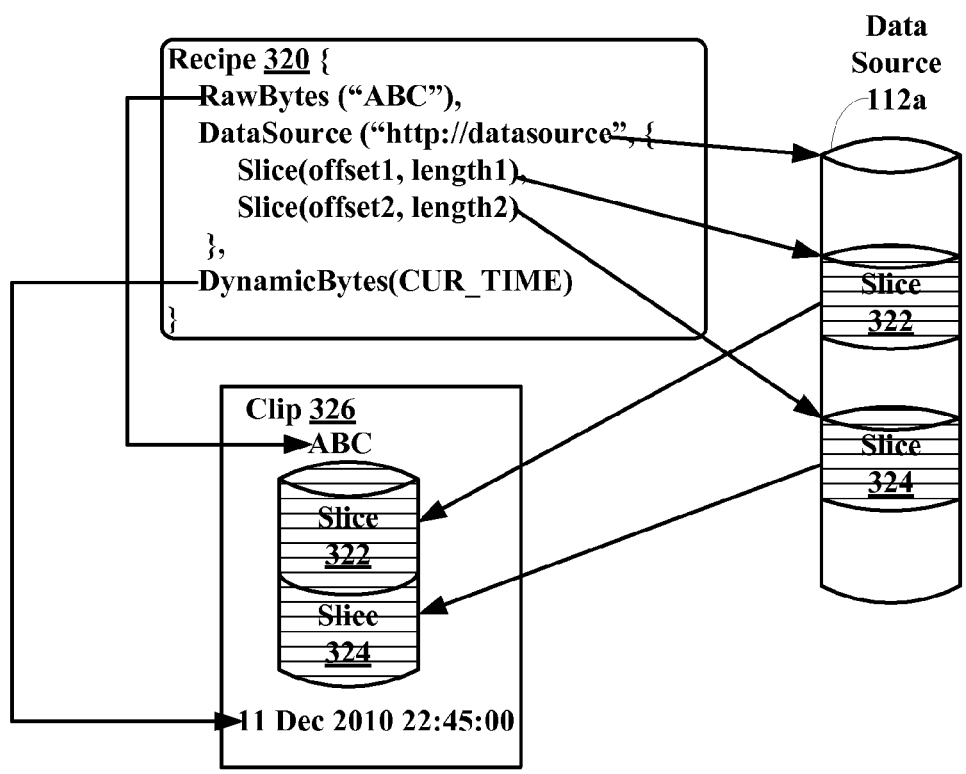

FIGS. 3A and 3B together depict a scenario 300 in accordance with an example embodiment. Scenario 300 depicts example communications for delivering a requested clip from data source 112a to client device 104a utilizing recipe server 108 and content server 110. In other scenarios not shown in FIGS. 3A-3C, other client devices other than 104a could be used, other servers than recipe server 108 and/or content server 110 could be utilized, and/or other data sources (including more or fewer data sources) than data source 112 could be accessed.

A clip can be requested to provide part or all of a data source. For example, a clip can be used to provide an entire audio and/or video data source, such as listening to an entire song or playing an entire video. As another example, a user could receive a communication to start viewing a combined 12-minute long combined audio and video program at the 10 minute, 30 second mark. In this case, the clip could be the portion of the audio and video program beginning 10 minutes and 30 seconds into the program and ending at the ending 12-minute mark of the program.

As a further example, a user can generate a "seek request" to view a portion of a audio and/or video file or stream past the currently-displayed portion of the audio and/or video file or stream, such as when a user decides to skip forward beyond an currently-viewed portion of a video stream or currently-listened portion of an audio stream. In this case, the clip can be the portion of the video and/or audio stream that begins at a location where the user selected to skip forward to in the video and/or audio stream and ends at the end of the video and/or audio stream. In particular, suppose a user was listening to a 20-minute audio stream and had listened to the audio stream for 2 minutes. Then, further suppose the user decided to skip ahead from the current 2 minute mark to the 15-minute mark in the audio stream, and generated a seek request to the 15-minute mark. In response to this seek request, the requested clip could start at a location 15 minutes into the audio stream and end at the end of the audio stream, which in this case is at the 20 minute mark.

Scenario 300 begins with client device 104a communicating clip request 310 to content server 110. In scenario 300, clip request 310 requests a clip of data source 112a. In other scenarios, clip request 310 can request clips of data source(s) other than just data source 112a. Clip request 310 can be specified as one or more locations within data source 112a (e.g., 100 bytes starting at byte 1000), based on a time (e.g., the clip at 2:17 to 2:22 of a video and/or audio data source), based on keywords (e.g., 100 bytes on either side of the first occurrence of the word "flamethrower" in data source 112a), and/or based on other criteria.

At block 312, content server 110 can search a cache to determine whether the requested clip can be delivered from data stored within the cache. In some embodiments, the cache can be data storage physically resident at (i.e., part of) content server 110; while in other embodiments, the cache need not be physically resident at content server 110.

In scenario 300, the cache does not contain all of the data requested by clip request 310. Consequently, content server 110 sends recipe request 314 to recipe server 108. In some embodiments, recipe request 314 is a copy of clip request 310 (e.g., content server forwards on clip request 310 to recipe server as recipe request 314).

Upon reception of clip request 310, recipe server can interpret clip request 310 and generates a recipe 320 at block 316 that corresponds to clip request 310. Once recipe 320 has been generated, recipe server 108 can send recipe response 330 that includes recipe 320 to content server 110.

In some embodiments, recipe server 108 can screen recipe request 314 to verify that content server 110 is authorized to request recipes, perhaps based on an address related to the sender of recipe request 314. In these embodiments, recipe server 108 can first determine that content server 110 is authorized to request recipes before generating a recipe at block 316. In these embodiments, when recipe server 108 determines that content server 110 is not authorized to request recipes, recipe request 314 can be discarded and/or an error response to recipe request 314 can be sent from recipe server 108 to content server 110.

At block 334, content server 110 receives recipe response 330 and uses (e.g., interprets or otherwise parses) recipe 320 included in recipe response 330 to generate clip 326. Content server 110 can parse recipe 320 to determine tasks associated with recipe 320 and carry out the determined tasks to generate clip 326.

Turning to FIG. 3B, recipe 320 of scenario 300 is shown with three tasks. In some embodiments, content server 110 parses recipe 320, at least in part, by scanning for one or more keywords to determine that recipe 320 conforms to a recipe format. For example, a recipe can begin with a recipe-beginning symbol, such as "Recipe", and end with a recipe-ending symbol, such as a right bracket "}". Content server 110 can scan recipe 320 to find a recipe-beginning symbol or perhaps one or more other or additional keywords to indicate a beginning of a recipe. In some embodiments, the recipe-ending symbol can match the recipe-beginning symbol and/or another symbol, such as the left bracket shown in FIG. 3B on line 1 of recipe 320. In other embodiments not shown in FIGS. 3A-3B, recipe 320 can include multiple recipes.

Content server 110 can parse recipe 320 to determine that there are one or more tasks in recipe 320. A task can include a task-keyword, such as "RawBytes", "DynamicBytes", "DataSource", or "Continuation", to identify the task and zero or more task-parameters associated with the task-keyword. Each task can be separated by other tasks by a task-delimiter, such as the comma ending lines 2 and 6 of recipe 320 or a right bracket, such as shown on line 7 of recipe 320 in FIG. 3B. Other task-delimiters are possible as well.

Based on the task-delimiters mentioned above, content server 110 can determine that recipe 320 has three tasks: a "RawBytes ("ABC")," task, a "DataSource ('http://datasource', Slice(offset1, length1), Slice(offset2, length2)}" task, and a "DynamicBytes(CUR_TIME)" task. Thus, content server 110 can parse recipe 320 determine that the first task is a "raw-data" task, the second task is a "data source" task, and the third task is a "dynamic-data" task, based on these task-keywords.

Content server 110 can parse each task of recipe 320 to determine the task-parameters for each task, and then perform the tasks specified in the recipe. The first task has a task-keyword of "RawBytes" and one task-parameter "ABC", which is specified within parentheses. The second task has a task-keyword of "DataSource" and three task-parameters: "'http://datasource", "Slice(offset1, length1)", and "Slice(offset2, length2)." These three task-parameters are specified within parentheses and separated by commas. The third task has a task-keyword of "DynamicBytes" and one task-parameter "CUR_TIME" specified within parentheses. Many other types of tasks, task-keywords, and/or task-parameters are possible as well.

In some embodiments, the output of a recipe can be stored in a single buffer, perhaps to be sent as a single whole. In these embodiments, in addition to one of a RawBytes, a DynamicBytes, or an DataSource, each Task can include a byte offset and byte length as well, such as shown in the example recipe of Table 3 below:

TABLE 3

| 0, 3, RawBytes("ABC") |
| 3, 4, DataSource("http://.../LowercaseEnglishAlphabet", {Slice(0, 4)}) |
| 5, 1, DataSource("http://.../UppercaseEnglishAlphabet", {Slice(25, 1)}) |

For example, the first task shown in the example has a byte offset of 0 (beginning of buffer), a byte length of 3, and is a RawBytes task with an output of "ABC". The second task would generate 4 bytes with a byte offset of 3 for the first four bytes (characters) of the "LowercaseEnglishAlphabet" data source for an output of "defg." After executing the second task, the buffer would have 7 bytes of data: "ABCdefg." Then, the third task is executed, the sixth byte in the buffer having a zero-based offset of 5, which is the letter "f" in the buffer, would be replaced with a "Z". The resulting buffer and therefore the resulting clip for the example recipe is "ABCabZd".

Specifying byte offset/byte length pairs for tasks can allow rewriting sections of clips, particular those from DataSource tasks, without splitting them into multiple tasks. For example, in some media samples, timestamps are interleaved with the media data. When requesting a chunk of these types of media samples, the resulting timestamps start at the beginning of the chunk; that is at the current byte offset, instead of at byte offset 0, which is at the start of the media sample.

Using byte offset/length pairs permits buffering the whole clip then updating timestamps throughout the buffer as needed before sending the entire buffer. These recipes would have been very large even for relatively short seek clips, but the clips would have correct timestamps.

Other effects based on partial or complete buffering can be generated. For example, overwriting selected audio samples or applying filters to selected video samples at clip generation time can be used. One application of partial or complete buffering can be to delay sending of content for a predetermined amount of time (e.g., several seconds) via buffering the several seconds of audio and/or video. The partial buffer could be configured to store the content for at least the predetermined amount of time. Then, content from the buffer would only be emitted after receiving an "OK to send" or similar signal, but otherwise could be overwritten.

One example could be when objectionable content were generated during the predetermined amount of time. Then, the objectionable content could be overwritten before the objectionable content was released from the buffer (a.k.a. "bleeped out" audio). Similarly, a partial or complete buffer could be configured to store a predetermined amount of content that is later replaced, such as a series of blank video frames and/or audio to be replaced by actual content, such as advertising, highlights, information of local interest, and/or other actual content.

Table 4 below includes example pseudo-code for a recipe player class "RecipePlayer" to execute a recipe "recipe." The pseudo-code indicates that the recipe can include RawBytes, DynamicBytes, DataSource, and Continuation tasks (see Table 2 above for continuations). The example pseudo-code below does not include instructions for the byte offset/byte length fields discussed above in the context of Table 3.

TABLE 4

```
class RecipePlayer {
    Play(recipe) {
        for each task in recipe {
            if task isa RawBytes {
                emit(task.bytes)
            } else if task isa DynamicBytes {
                dynamic bytes =""
                if task isa CUR_TIME {
                    dynamic bytes = getTimestamp( )
                } else if task isa CUR_HOST {
                    dynamic bytes = getHostname( )
                } else if task isa CUR_NONCE {
                    dynamic bytes = getNonce( )
                }
                emit(dynamic bytes.pad(task.size, task.pad_byte))
            } else if task isa DataSource {
                chunk = Lookup or Fetch DataSource(task.url)
                for each slice in task.slices {
                    emit(chunk.substring(slice.start, slice.end))
                }
            } else if task isa Continuation {
                if task is last {
                    // tail-call optimization
                    recipe = Lookup or Fetch DataSource(task.url)
                } else {
                    // recursion
                    new RecipePlayer( ).Play(Lookup_or_Fetch_
                    DataSource(task.recipe))
                }
            }
        }
    }
}
```

In some embodiments, the content server 110 can perform the tasks in the order specified in a recipe to generate a clip; for example, the raw-data task of recipe 320 can be performed before the data-source task of recipe 330 in generating clip 326.

As mentioned above, the first task, shown in FIG. 3B on line 2 of recipe 320, is a raw-data task with one task-parameter: "ABC". The raw-data task can insert the character(s) specified as task-parameter(s) into a clip. As shown in FIG. 3B, the raw-data task shown in recipe 320 can insert the characters "ABC" at a beginning of clip 326.

The second task, shown in FIG. 3B on lines 3-6 of recipe 320 is a data-source task with three task-parameters. The first task-parameter is an address of a data source ("http://datasource") and the last two task-parameters are two slice definitions. The data-source task can insert one or more slices, specified as slice definition(s), of specified data source(s) into a clip.

In scenario 300, each slice definition of recipe 320 specifies a slice to be extracted from data source 112a. The first slice definition shown in FIG. 3B has an offset of "offset1" and a length of "length1." This offset/length pair leads to a range of slice addresses from offset1 to offset1+length1−1. For example, if offset1=20, and length1=10, then the range of slice addresses starts at offset1=20, and ends at offset1+length1−1=20+10−1=29.

Content server 110 can use the first slice definition to begin at offset1 and extract a sequence of data elements of length length1 from data source 112a. FIG. 3B shows the first slice as slice 322 of data source 112a and of clip 326. In clip 326, slice 322 is shown appended to the previously-inserted "ABC" bytes. Similarly, content server can use the second slice definition of recipe 320 to generate a second slice 324 of data source 112a starting at offset2 with a sequence of data elements of length length2. Slice 324 is then appended to slice 322 as part of clip 326.

In some embodiments, slice definitions can utilize offsets and lengths based on chunk sizes of a cache, as discussed above in the context of FIG. 2A. A "full" chunk of the cache stores the chunk size of Y bytes of user data, while a "non-full" chunk stores less than Y bytes of user data. For example, in a cache with 2 MB chunks (e.g., Y=2 MB), suppose two storage requests were received at the cache: a first request to store 2 MB of user data and a second request to store 1.2 MB of user data. Since the first request is to store 2 MB of user data, the corresponding cache chunk is a full chunk storing 2 MB bytes of user data. In contrast, the cache chunk corresponding to the second request is a non-full chunk, as only 1.2 MB of user data bytes are stored in the 2 MB chunk, leaving 0.8 MB free.

When a length L of a slice definition is a non-negative integer multiple of the chunk size Y; i.e., L=m1*Y, where m1=a positive integer, then the corresponding slice can be classified as a chunk-aligned slice, and the chunk-aligned slice can be stored in m1 full chunks of the cache. By specifying chunk-aligned slices, the recipe server can fully utilize storage within each chunk.

Offset values can be chunk-aligned. That is, an offset O of a slice definition is a chunk-aligned offset when O is a multiple of a chunk size; i.e., O=m2*Y, where Y=the chunk size and m2=a non-negative integer. In combination, chunk-aligned offsets and chunk-aligned lengths for slices can permit the recipe server to address a data source in chunk-aligned slices, where each chunk starts at a multiple of the chunk size, thereby simplifying addressing at the recipe server.

The third task, shown in FIG. 3B on line 7 of recipe 320 is a dynamic-data task with one task-parameter "CUR_TIME". The dynamic-data task can generate an output based on the task-parameter(s) parameters to determine that the current time is to be output. For example, suppose clip 326 is generated on Dec. 11, 2010 at 22:45:00. Then, the dynamic-data task could examine the example "CUR_TIME" parameter, generate a time stamp with the then current time, and insert the generated time stamp into the clip. As shown in FIG. 3, the example timestamp inserted into clip 326 is "11 Dec. 2010 22:45:00."

Returning to FIG. 3A, once content server 110 has completed all of the tasks in recipe 320 to generate clip 326, content server 110 can send clip response 336 including clip 326 to client device 104a to complete scenario 300.

In some embodiments, part or all of clip request 310, recipe request 314, recipe 320, clip 326, recipe response 330, and/or clip response 336 are communicated in a compressed format, perhaps to save bandwidth. In other embodiments, part or all of clip request 310, recipe request 314, recipe 320, clip 326, recipe response 330, and/or clip response 336 are communicated in an encrypted format, perhaps to enhance security.

Figure 3C:
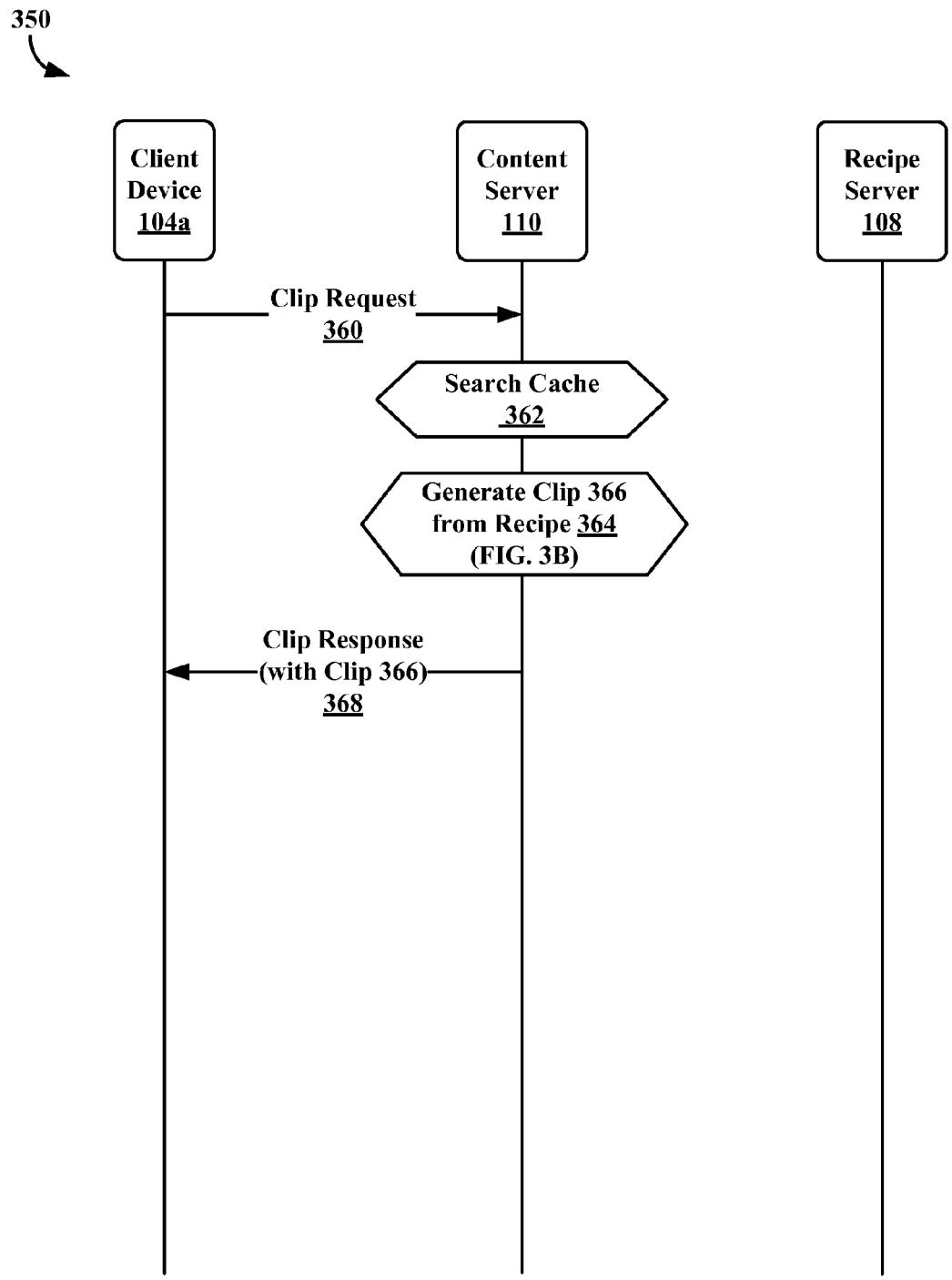
FIG. 3C depicts another scenario in accordance with an example embodiment.

FIG. 3C depicts a scenario 350 in accordance with an example embodiment. Scenario 350 begins with client device 104a sending clip request 360 to content server 110. At block 362, content server 110 searches a cache to determine whether the requested clip can be delivered from data stored within the cache. In scenario 350, the cache already stores data for the requested clip and a corresponding recipe for the requested clip.

At block 364, content server 110 uses the cached recipe and cached content for the requested clip to generate clip 366. The procedures for generating a clip, such as clip 366, utilizing a recipe are described above in more detail in the context of FIG. 3B. Once content server 110 has generated clip 366, content server 110 can send clip response 368 including clip 368 to client device 104a. In some embodiments, part or all of clip request 360 and/or clip response 368 are communicated in a compressed format, perhaps to save bandwidth. In other embodiments, part or all of clip request 360 and/or clip response 368 are communicated in an encrypted format, perhaps to enhance security.

By caching recipes and data for clips, content server 110 can reduce the amount of bandwidth used to generate clip, both by reducing the bandwidth to communicate to recipe server 108 and by reducing any bandwidth required to communicate content in the clip. In some embodiments, recipe server 108 specifies recipes with chunk-aligned slices to address content stored in chunk-sized units in a cache of content server 110 to increase the number of full chunks in the cache of content server 108.

For example, in a video-display application, a user generates a seek request to view a portion of a clip past the currently-displayed portion of the clip. The seek request can involve generation of a new clip with new "metadata" about a current position in the clip, etc. but with content data copied selectively from the originally cached clip. Using chunk-aligned slices, perhaps with relatively large chunks of data stored at a time, increases the probability that the selective media data copy can reuse content data already stored in the cache.

Media-Container Clips

Figure 4:
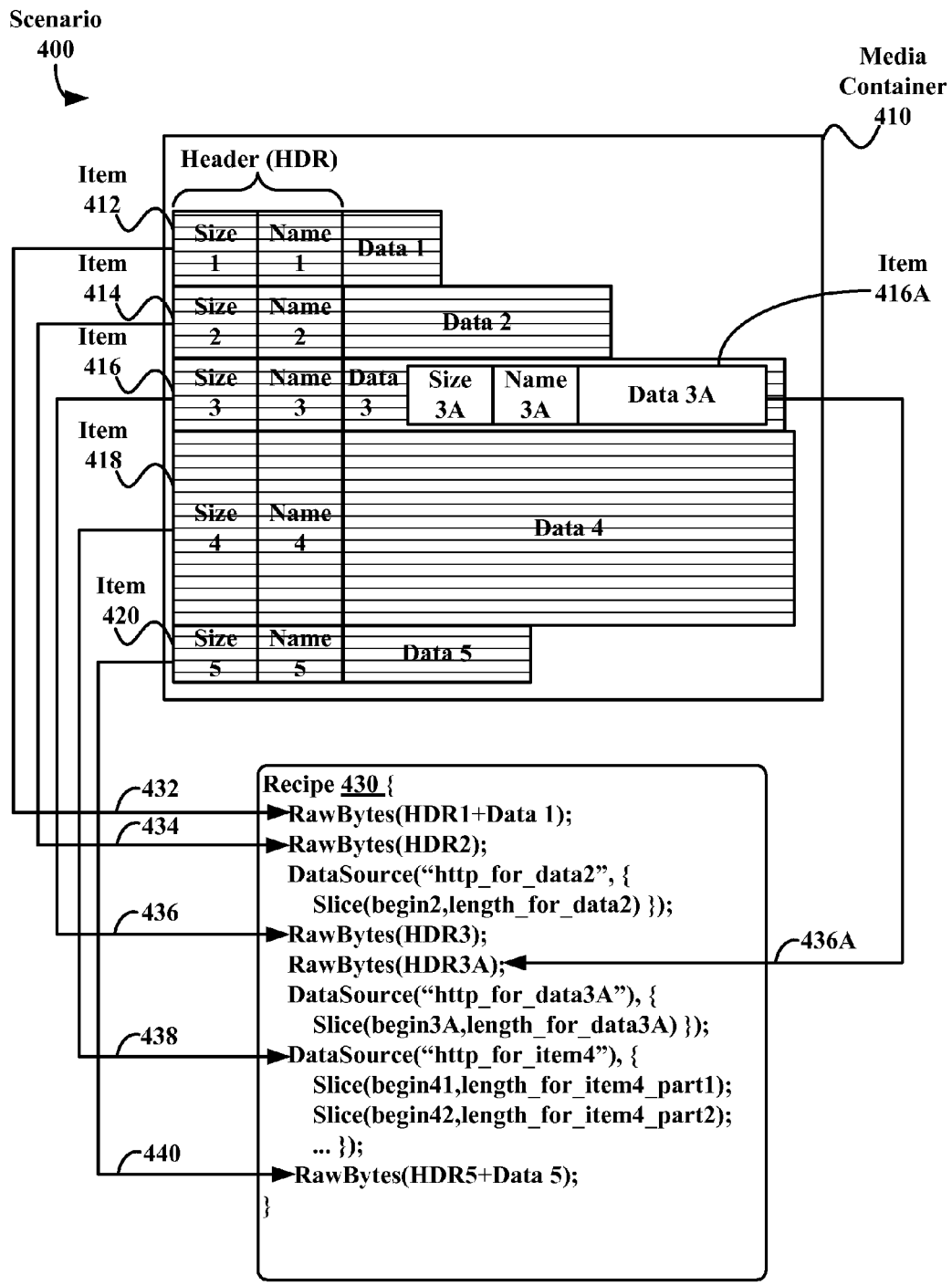
FIG. 4 depicts yet another scenario in accordance with an example embodiment.

FIG. 4 depicts a scenario 400 in accordance with an example embodiment. In scenario 400, a clip corresponding to media container 410 is to be generated. Media container 410 can correspond to a multimedia container, such as an MPEG4-formatted multimedia container, QuickTime-formatted multimedia container, and/or another multimedia container.

FIG. 4 shows media container 410 with five "items" 412, 414, 416, 418, and 420. Each item includes a header (HDR) and data, where each header includes a size field and a name field, and the data can be in a data field. For example, FIG. 4 shows item 412 with a header including a size field with "Size 1", a name field with "Name 1", and a data field with "Data 1."

In some cases, items can contain sub-items. FIG. 4 shows item 416 with a header and a data field containing a sub-item of item 416A. Item 416A in turn has a header with a size field of "Size 3A", a name field with "Name 3A", and a data field with "Data 3A", all of which are included in the data field of item 416.

Items can be of various sizes. FIG. 4 shows item 418 as relatively larger in the figure than the other four items of media container 410 to indicate that item 418 is relatively larger than the other four items. Similarly, item 412 is shown as relatively smaller than the other four items of media container 410 to indicate that item 412 is relatively smaller than the other four items.

In other scenarios not depicted in FIG. 4, a media container can include more, different, and/or fewer items and/or each item of the media container can include more, different, and/or fewer fields than shown for items in FIG. 4.

Scenario 400 includes generation of recipe 430 corresponding to media container 410. FIG. 4 shows item 412 with a corresponding task 432 in recipe 430. Task 432 is shown as a RawBytes task that includes pre-determined data for both "HDR1" (i.e., the header fields of item 412) and the data field "Data 1" of item 412. Similarly, FIG. 4 shows item 420 with one corresponding task 440 of recipe 430, where the corresponding task 440 is a RawBytes task including pre-determined data for HDR5 and the data field "Data 5" of item 420.

To generate a clip with one item in a media container, a recipe can include one task, such as discussed above for items 412 and 420, or multiple tasks. For example, FIG. 4 shows item 414 corresponding to two tasks 434 in recipe 430. The first of these tasks is a RawBytes task to insert pre-determined data as the header of item 414. The second task, which corresponds to the data field of item 414, is a DataSource task with a data source a data source addressed by "http_for_data2" and slice definition with an offset of "begin2" and a length of "length_for_data2."

FIG. 4 shows that item 416 corresponds to one RawBytes task 436 to insert the header of item 416 as pre-determined data, and that sub-item 416A corresponds to two tasks 436A. The two tasks 436A include a RawBytes task to insert the header of item 416A as pre-determined data and a DataSource task to insert a slice of a data source addressed by "http_for_data3A" starting at offset "begin3A" with length "length_for_data3A".

FIG. 4 also shows that item 418 corresponds to one DataSource task 438 to insert two (or more) slices of a data source addressed by "http_for_item4". In this example, the slice at offset "begin41" and perhaps the slice at offset "begin42" include the data for the header of item 418. Thus, recipes with relatively simple tasks, as discussed above, enable generation of even complex clips, such as the clip corresponding to media container 410.

Splice-types of clips can be generated using recipes as well. In a video-related splice, a header for the resultant video-related splice can contain synthesized information from all the constituent sources. For example, a video-related splice conforming to the MPEG-4 Part 14 format (a.k.a. the MP4 format) can have multiple TRAK boxes for each source (e.g., one for audio media, one for video media, one for timed text caption media, etc.) In the MP4 format, each TRAK box must contain exactly one Sample Table (STBL), which must contain exactly one Sample Table of Chunk Offsets (STCO), exactly one Sample Table of Sample siZes (STSZ), exactly one Sample Table of Sample-to-Chunk mapping (STSC), exactly one Sample Table of Time-to-Sample (STTS), exactly one Sample Table Sample Descriptor (STSD), and may also contain one Sample Table of Seekable Samples (STSS). The Sample Table of Sample Sizes can specify how many bytes are contained in each media sample in a given track, a Sample Table of Seekable Samples can specify which samples in a video track can be displayed without accounting for any previous samples, and a Sample Table of Time-to-Sample specifies the playback duration of each sample in a normalized measure of time. Other Sample Tables are possible as well.

In a video-related splice conforming to the MPEG-4 Part 14 format, each Sample Table in each TRAK in each constituent video is joined together corresponding Sample Tables in the corresponding TRAKs in the other constituent videos to ensure all sample tables all TRAKs are consistent. Sample Tables can be generated by the recipe server using RawBytes and/or DynamicBytes tasks and/or can be generated indirectly by taking a slice of a DataSource that includes a given Sample Table. Many other types of splices are possible as well.

A template recipe for generating a MPEG-4 Part 14 compliant clip with both audio and video table is shown in Table 5 below:

TABLE 5

RawBytes(<to generate a media header>)
DataSource(<to retrieve an audio Sample Table>)
RawBytes(<end of audio metadata and beginning of video metadata>)
DataSource(<to retrieve a video Sample Table>)
RawBytes(<end of audio metadata and header for host name>)
DynamicBytes(HOST_NAME)
RawBytes(<header for a playback time-stamp>)
DynamicBytes(CUR_TIME)
<more RawBytes/DynamicBytes pairs as needed>
RawBytes(<captioning and header(s) media data>)
DataSource("datasource", <slices for content>)
[optional additional DataSource task(s) as needed for the clip]

A clip can generated using the template recipe can be splices and "ordinary" types of clips as mentioned above, as well as muxes. Generating a mux-type of clip involves reading a data source containing a single track, and merging the single track into an existing clip. For example, the video track could be mux-ed into an audio track using the template recipe of Table 5. In some embodiments, tweaks are applied to the template recipe and/or any other recipe described herein to ensure proper display on a specific device and/or using specific display software.

FIG. 5 depicts a scenario 500 for utilizing an example cache 510 of a content server, such as content server 110, in accordance with an example embodiment. Cache 510 is divided into eight chunks, 512a-512h, with each chunk configured to store Y bytes of data. Example values for Y include powers of two, such as 65,536, 131,072, 262,144, 524,288, and 1,048,576. Many other values for Y are possible as well.

FIG. 5 shows that cache 510 includes cache addresses 514. For example, FIG. 5 shows that chunk 512a is associated with cache addresses between 0 and Y-1, chunk 512b is associated with cache addresses between Y and 2Y-1, and so on until reaching chunk 512h, which is associated with cache addresses between 7Y and 8Y-1. In some embodiments, attempting to access cache addresses less than 0 or greater than 8Y for cache 510 can lead to a memory fault, exception, or other error.

In the example shown in FIG. 512, byte addressing can be used for data within each chunk. That is, the data in chunk 512a can be addressed, or accessed, by specifying cache addresses in the range 0 to Y-1, for a total of Y bytes and that each access will deliver at least one byte of data. Other addressing schemes other than byte addressing can be used as well.

FIG. 5 shows chunks that are unused without shading, and shows chunks that are used with shading. In scenario 510, a recipe with task 520 is processed. Task 520 is a DataSource task to generate part or all of a clip of "http:// . . . video1" (or "video1" for short). As shown in FIG. 5, task 520 includes three slices: slice 522 with a slice definition of "Slice(0,Y)" of "video1", slice 524 with a slice definition of "Slice(Y,Y)" of "video1" and slice 526 with a slice definition "Slice(2Y, 0.4Y)" of "video1."

Slice 522 is a chunk-aligned slice with a chunk-aligned offset that requests the first Y bytes from "video1." As mentioned above, a slice is chunk-aligned when a length L of a slice definition is a non-negative integer multiple of the chunk size Y; i.e., L=m1*Y, where m1=a positive integer. An offset O of a slice definition is a chunk-aligned offset when the offset O is a multiple of a chunk size; i.e., O=m2*Y, where Y=the chunk size and m2=a non-negative integer. In the case of chunk-aligned slice 522, the length L=Y and the offset O=0, so m1=1 and m2=0. A chunk-aligned slice can completely fill one or more chunks of a cache. FIG. 5 shows that the first slice completely fills chunk 512f, making chunk 512f a full chunk. Similarly, FIG. 5 shows slice 524 is a chunk-aligned slice that completely fills chunk 512g.

Slice 526 is not chunk aligned as the length L of slice 526 is 0.4Y, which is not an integer multiple of the chunk size Y. However, the offset O of slice 526 is chunk-aligned, with a starting slice address being multiple of 2 of the chunk size Y. FIG. 5 shows slice 526 is stored in chunk 512h of cache 510.

In some embodiments, content server 110 utilizing cache 510 maintain a table or similar data structure that tracks the chunks of cache 510 that store slices from data source(s). Table 6 below shows an example table for mapping data source slices and cache chunks for cache 510 storing slices 522-526 as shown in FIG. 5.

TABLE 6

| Cache Chunk | Start Chunk Address | End Chunk Address | Data Source | Start Slice Address | End Slice Address |
| --- | --- | --- | --- | --- | --- |
| 512a | 0 | Y-1 | <empty> | <empty> | <empty> |
| 512b | Y | 2Y-1 | <empty> | <empty> | <empty> |
| 512c | 2Y | 3Y-1 | <empty> | <empty> | <empty> |
| 512d | 3Y | 4Y-1 | <empty> | <empty> | <empty> |
| 512e | 4Y | 5Y-1 | <empty> | <empty> | <empty> |
| 512f | 5Y | 6Y-1 | video1 | 0 | Y |
| 512g | 6Y | 7Y-1 | video1 | Y | 2Y-1 |
| 512h | 7Y | 7.4Y-1 | video1 | 2Y | 2.4Y |
| 512h | 7.4Y | 8Y-1 | <empty> | <empty> | <empty> |

Scenario 500 continues with the later receipt of task 530 while the slices requested by task 520 are still stored in chunks 512f-512h of cache 510. FIG. 5 shows that task 530 is a DataSource task for "video1" that includes slices 532 and 534. Together slices 532 and 534 request the last Y bytes of "video1."

FIG. 5 shows slice 532 with a slice definition of "Slice (1.4Y,0.6Y)" that is chunk aligned and the offset of slice 532 is also chunk aligned, with m1=1 and m2=2. Slice 532 requests the portion of "video" with a range of slice addresses from 1.4Y to 2Y-1. FIG. 5 also shows slice 534 with a slice definition of "Slice(2Y,0.4Y)" for a non-chunk-aligned slice with a chunk-aligned offset that addresses a range of slice addresses from 2Y to 2.4Y-1.

To carry out task 530, content server 110 can use a table, such as example Table 6 above, to assist in reuse of already-stored content. Reuse of already-stored content permits at content server 108 can increase network performance by saving transmission of data that has already been stored and increase memory performance by not storing multiple copies of the same data (the already-stored content).

For example, content server 110 can first search the data sources in Table 6 for "video1." Upon finding at least part of "video1" is stored in cache 510, content server can look for chunk(s) that store the range of slice addresses specified by slice 532 of 1.4Y to 2Y-1. Content server 110 can find that chunk 512g with chunk addresses 5Y to 6Y-1 stores a slice of video1 whose slice addresses are from Y to 2Y-1, and thus includes the slice addresses in 1.4Y to 2Y-1. Then, to generate slice 532, content server 110 can retrieve the data stored at cache addresses 5.4Y to 6Y-1 of chunk 512g, which correspond to slice addresses in 1.4Y to 2Y-1, and used the retrieved data to generate slice 532.

Similarly, content server 110 can search Table 6 to find that the range of slice addresses of slice 534 of 2Y to 2.4Y-1 for data source "video1" are stored in chunk 512h and have cache addresses of 6Y to 6.4Y-1. The data for slice 534 can then be retrieved from addresses 6Y to 6.4Y of chunk 512h.

Recipe server 108 can be configured to, when possible, consistently generate DataSource tasks that simplify addressing between recipes and better utilize memory systems, such as cache 510 into account. For example, recipe server 108 can be configured to generate chunk aligned slices, slices that start with a slice address that corresponds to a possible start address of a chunk, slices that end with a slice address that corresponds to a possible end address of a chunk, and/or specify the use of full chunks. For example, FIG. 5 shows task 520 with two slices 522 and 524 that each specify a chunk-aligned slice that completely fills a cache chunk, starts on a start address of a chunk, and ends on an end address of a chunk. Also, task 520 includes slice 526 that starts with a slice address that corresponds to a start address of a chunk. As another example, FIG. 5 shows task 530 with slice 532 that ends with a slice address that corresponds to an ending address of a chunk and slice 534 that starts with a slice address that corresponds to a start address of a chunk. Many other techniques can be utilized by recipe server 108 to simplify addressing between recipes and better utilize memory systems during recipe generation as well.

Example Operations

Figure 6:
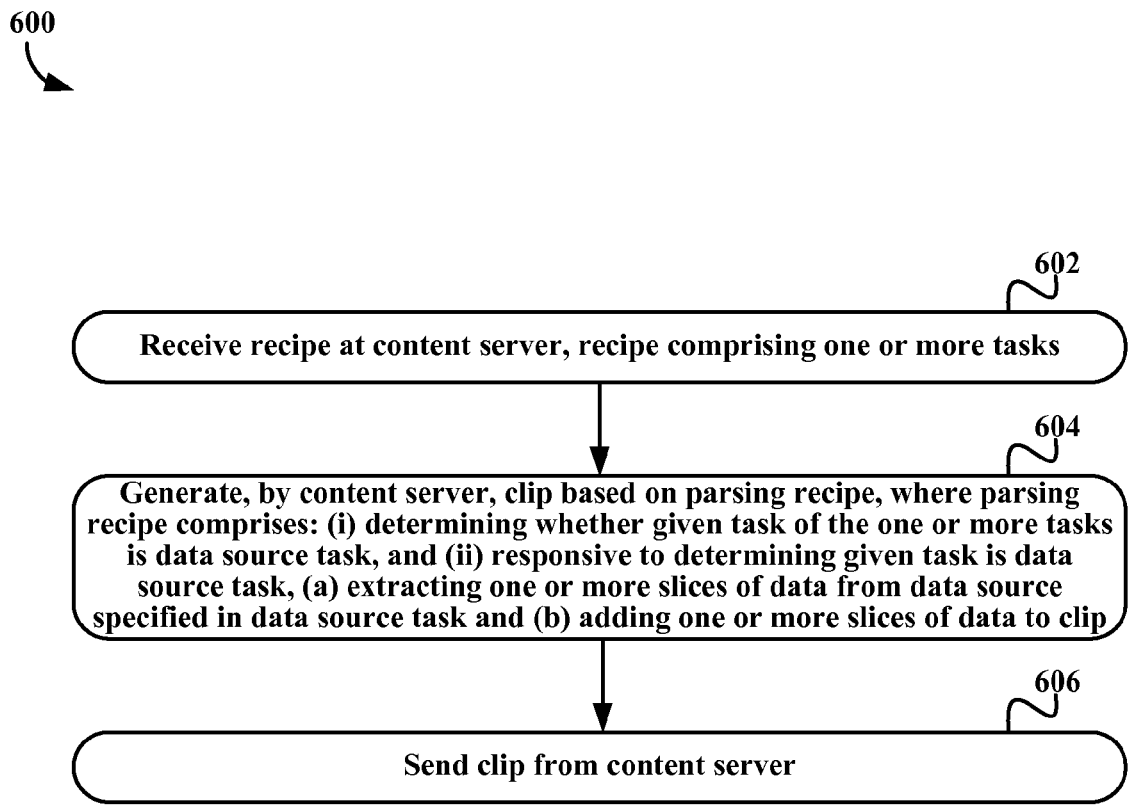
FIG. 6 is a flow chart of a method in accordance with an example embodiment.

FIG. 6 is a flow chart of an example method 600 in accordance with an example embodiment. At block 602, a recipe is received at a content server, such as content server 110 described above. The recipe can include one or more tasks. Tasks, recipes, content servers, and recipe servers are discussed above at least in the context of FIGS. 3A-5.

At block 604, the content server can generate a clip by parsing the recipe. Parsing the recipe can include determining whether a given task of the one or more tasks is a data-source task. Upon a determination that the given task is a data-source task, one or more slices of the data source can be extracted from a data source specified in the data-source task. The one or more slices can be added to the clip. For example, a recipe can include one or more data-source tasks, such as described above at least in the context of FIGS. 1-5.

In some embodiments, parsing the recipe can further include (a) determining whether the task is a raw-data task, in response to determining that the given task is not a data-source task and (b) extracting one or more elements of data from the raw-data task and adding the one or more elements of data to the clip, in response to determining that the given task is a raw-data task. For example, the above-mentioned "RawBytes" task includes a specification of one or more bytes of pre-determined data to be inserted into a clip. Raw-data and RawBytes tasks are described above in more detail above at least in the context of FIGS. 3A-4.

In other embodiments, parsing the recipe can further include (a) determining whether the task is a dynamic-data task, in response to determining that the given task is not a data-source task and (b) generating one or more elements of data based on a task-parameter of the dynamic-data task and adding the one or more elements of data to the clip, in response to determining that the given task is a dynamic-data task. For example, the above-mentioned "DynamicBytes" task can generate one or more elements of data based on task-parameter(s) provided to the DynamicBytes task. Dynamic-data and DynamicBytes tasks are described above in more detail above at least in the context of FIGS. 3A-4.

In still other embodiments, a "RawBits" task could include a bit-wise specification of one or more bits of pre-determined data to be added to the clip. For example, a RawBits ("00011011") task could be used to insert 8 bits equal to 00011011 (decimal value of 27) into the clip.

In yet other embodiments, extracting the one or more slices of data can include scanning the data-source task for a slice definition comprising a data-source offset and a number of elements and extracting the number of elements, beginning at the data-source offset, from the data source. For example, as mentioned above, a DataSource task can specify a data source for extraction and one or more offset/length pairs of values for extracting slice(s) of the data source, as discussed above in more detail above at least in the context of FIGS. 3-5.

At block 606, the content server can send the clip. The clip can be sent as part of a clip response discussed above in more detail at least in the context of FIG. 3.

In other embodiments, the content server can include a cache. The cache can include a number of chunks and can be configured to store at least part of the data source. In this context, the data-source offset and/or the number of elements can be chunk aligned.

In some of these other embodiments, the content server can be further configured to receive a second recipe. The second recipe can include a second data-source task that specifies use of the data source. A second clip can be generated based on parsing the second recipe. Parsing the second recipe can include retrieving at least part of the data source from the cache and extracting one or more second slices of data from the at least part of the data source retrieved from the cache.

In still other embodiments, at least part of the clip can be formatted using a media-container format. Media-container formats are discussed above in more detail at least in the context of FIG. 4.

In even other embodiments, some or all the procedures described with respect to method 600 as being carried out by a content server can be carried out by a recipe server, such as recipe server 108 described above, a combination of a content server and a recipe server, and/or by one or more other computing devices.

Figure 7:
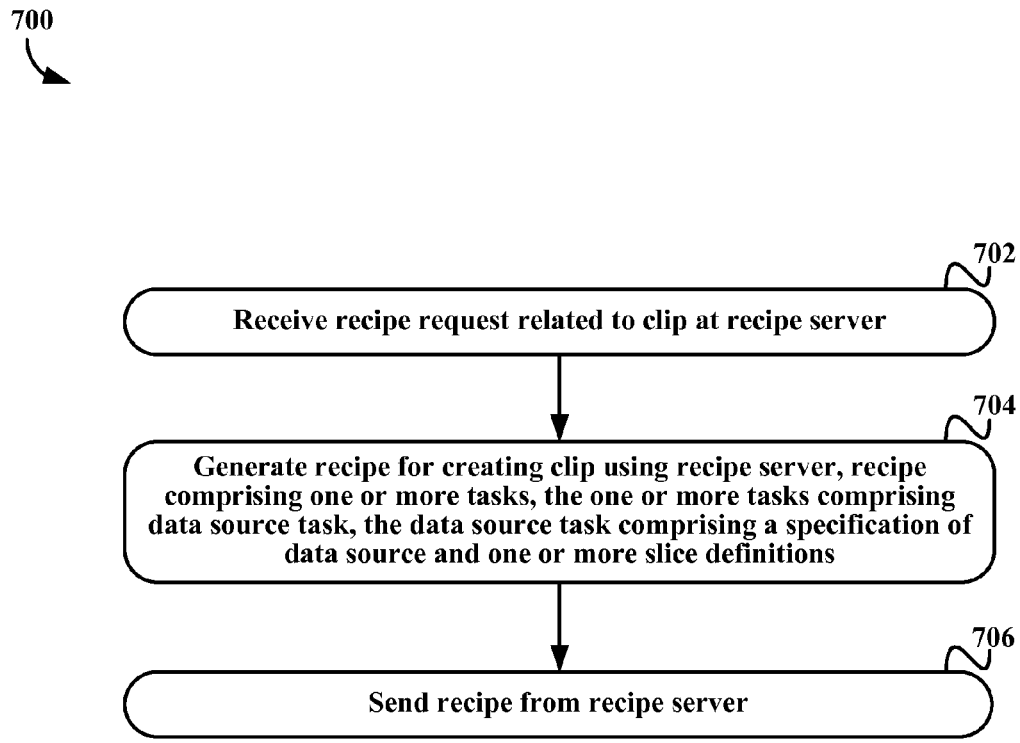
FIG. 7 is a flow chart of another method in accordance with an example embodiment.

FIG. 7 is a flow chart of another example method 700 in accordance with an example embodiment. At block 702, a recipe request for a recipe related to a clip is received. The recipe request can be received at a recipe server, such as recipe server 108 described above. Recipe requests for related to clips are discussed above in more detail at least in the context of FIGS. 3A-3C.

At block 704, a recipe is generated for creating the clip. The recipe, which can be generated by the recipe server, includes one or more tasks. The one or more tasks can include a data-source task. The data-source task can include a specification of a data source and one or more slice definitions. For example, as mentioned above, a DataSource task can specify a data source for extraction and one or more slice definitions in terms of offset/length pairs of values for extracting slice(s) of the data source. DataSource tasks and recipes are discussed above in more detail at least in the context of FIGS. 3A-5.

In some embodiments, at least one slice definition of the one or more slice definitions includes a data-source offset and a number of elements. In particular of these embodiments, at least one of the data-source offset and the number of elements is chunk-aligned. Chunk-aligned data-source offsets and/or number of elements are described above at least in the context of FIGS. 2A, 3A, 3B, and 5.

In other embodiments, generating the recipe for creating the clip includes generating a recipe for creating a clip formatted using a media-container format. Recipes for creating clips in media-container formats are discussed above at least in the context of FIG. 4.

At block 706, the recipe is sent from the recipe server. Sending recipes is discussed above in more detail at least in the context of FIGS. 3A-3C.

In still other embodiments, the one or more tasks can include a raw-data task specifying one or more elements of data. In these embodiments, the clip further includes the one or more elements of data specified in the raw-data task. Raw-data tasks are discussed above in more detail at least in the context of FIGS. 3A-4.

In other embodiments, some or all the procedures described with respect to method 700 as being carried out by a recipe server can be carried out by a content server, such as content server 110 described above, a combination of a recipe server and a content server, and/or by one or more other computing devices.

CONCLUSION

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. It should be understood that the word "exemplary" is used herein to mean "serving as an example, instance, or illustration." Any embodiment described herein as "exemplary" is not necessarily to be construed as preferred or advantageous over other embodiments.

The preceding detailed description describes various features and functions of the disclosed systems, devices, and methods with reference to the accompanying figures. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A method, comprising:
   receiving, by a content server including a processor, a recipe comprising one or more tasks for generating a clip comprising at least one of audio or video, wherein the content server comprises a cache having a plurality of chunks, and wherein each chunk of the plurality of chunks is configured to store a predetermined positive number of bytes of data;
   parsing, by the content server, the recipe, wherein the parsing the recipe comprises:
      determining that a first task of the one or more tasks is a data-source task, and in response to determining that the first task is the data-source task:
         determining one or more slices of data from a data source specified in the data-source task, wherein the data source comprises a video data source or a combined video and audio data source, and
         for each slice of the one or more slices of data, specifying a slice value wherein respective slice values comprise slice lengths and slice offsets, wherein a slice of data of the one or more slices of data has a slice length and a slice offset specified such that an end address of the slice of data corresponds to an end address of a chunk of the plurality of chunks; and generating, by the content server, the clip by adding the one or more slices of data to the clip; and transmitting, by the content server, the clip to a device.

2. The method of claim 1, wherein the adding the one or more slices of data comprises:

scanning the data-source task for a slice definition comprising a data-source offset and a data-source length; and extracting a number of bytes equal to the data-source length, beginning at the data-source offset, from the data source.

3. The method of claim 2, wherein the cache is configured to store at least part of the data source, and wherein at least one of the data-source offset or the data-source length is chunk-aligned.

4. The method of claim 3, further comprising:

receiving, by the content server, a second recipe comprising a second data-source task specifying use of the data source; and generating a second clip based on parsing the second recipe, wherein the parsing the second recipe comprises:

retrieving at least part of the data source from the cache, and extracting one or more second slices of data from the at least part of the data source retrieved from the cache.

5. The method of claim 1, wherein the parsing the recipe further comprises:

determining that a second task of the one or more tasks is a raw-data task; and in response to the determining that the second task is the raw-data task, extracting one or more elements of fixed data from the raw-data task and adding the one or more elements of fixed data to the clip.

6. The method of claim 1, wherein the parsing the recipe further comprises:

determining that a second task is a dynamic-data task; and in response to the determining that the second task is the dynamic-data task, generating one or more elements of data based on a task-parameter of the dynamic-data task and adding the one or more elements of data to the clip.

7. The method of claim 1, wherein at least part of the clip is formatted using a media-container format.

8. The method of claim 1, wherein the content server is an edge server.

9. A server, comprising:

one or more processors; and a cache having a plurality of chunks, and wherein each chunk of the plurality of chunks is configured to store a predetermined positive number of bytes, and wherein the one or more processors are configured to:

receive a recipe comprising one or more tasks for generating a clip comprising at least one of audio or video;

generate the clip based on parsing the recipe, wherein parsing the recipe comprises:

determine whether a given task of the one or more tasks is a data-source task, and in response to a determination that the given task is the data-source task:

determine one or more slices of data from a data source specified in the data-source task, wherein the data source comprises a video data source or a combined video and audio data source, for each slice of the one or more slices of data, specifying a slice value for the slice, wherein respective slice values comprise slice lengths and slice offsets, wherein a slice of data of the one or more slices of data has a slice length and a slice offset specified such that an end address of the slice of data corresponds to an end address of a chunk of the plurality of chunks, and adding the one or more slices of data to the clip; and transmit the clip to a device.

10. The server of claim 9, wherein the one or more processors are further configured to parse the recipe by at least:

in response to a determination that the given task is not the data-source task, determining whether the given task is a raw-data task; and in response to a determination that the given task is the raw-data task, extracting one or more elements of fixed data from the raw-data task and adding the one or more elements of fixed data to the clip.

11. The server of claim 9, wherein the one or more processors are further configured to parse the recipe by at least:

in response to a determination that the given task is not the data-source task, determining whether the given task is a dynamic-data task; and in response to a determination that the given task is the dynamic-data task, generating one or more elements of data based on a task-parameter of the dynamic-data task and adding the one or more elements of data to the clip.

12. The server of claim 9, wherein the one or more processors are further configured to add the one or more slices of data by at least:

scan the data-source task for a slice definition comprising a data-source offset and a data-source length; and extract a number of bytes equal to the data-source length, beginning at the data-source offset, from the data source.

13. The server of claim 12, wherein the cache is configured to store at least part of the data source, and wherein at least one of the data-source offset or the data-source length is chunk-aligned.

14. The server of claim 13, wherein the one or more processors are further configured to:

receive a second recipe comprising a second data-source task specifying use of the data source; and generate a second clip based on parsing the second recipe, wherein the parsing the second recipe comprises:

retrieve at least part of the data source from the cache, and extract one or more second slices of data from the at least part of the data source retrieved from the cache.

15. The server of claim 9, wherein at least part of the clip is formatted using a media-container format.

16. A non-transitory computer-readable medium having instructions stored thereon that, in response to execution, cause a server comprising a cache having a plurality of chunks, and wherein each chunk of the plurality of chunks is configured to store a predetermined positive number of bytes of data, to perform operations comprising:

receiving a recipe comprising one or more tasks for generating a clip comprising at least one of audio or video;

generating a clip based on parsing the recipe, wherein the parsing the recipe comprises:

determining whether a given task of the one or more tasks is a data-source task, and in response to determining that the given task is the data-source task:

determining one or more slices of data from a data source specified in the data-source task, wherein the data source comprises a video data source or a combined video and audio data source, for each slice of the one or more slices of data, specifying a slice value, wherein respective slice values comprise slice lengths and slice offsets, wherein a slice of the one or more slices of data has a slice length and a slice offset specified such that an end address of the slice of data corresponds to an end address of a chunk of the plurality of chunks,
adding the one or more slices of data to the clip; and
transmitting the clip to a device.

17. The non-transitory computer-readable medium of claim 16, wherein the parsing the recipe further comprises:
in response to determining that the given task is not the data-source task, determining whether the given task is a raw-data task; and
in response to determining that the given task is the raw-data task, extracting one or more elements of fixed data from the raw-data task and adding the one or more elements of fixed data to the clip.

18. The non-transitory computer-readable medium of claim 16, wherein the instructions for parsing the recipe further comprise:
in response to determining that the given task is not a data-source task, determining whether the given task is a dynamic-data task; and
in response to determining that the given task is the dynamic-data task, generating one or more elements of data based on a task-parameter of the dynamic-data task and adding the one or more elements of data to the clip.

19. The non-transitory computer-readable medium of claim 16, wherein the instructions for adding the one or more slices of data comprise:
scanning the data-source task for a slice definition comprising a data-source offset and a data-source length; and
extracting a number of bytes equal to the data-source length, beginning at the data-source offset, from the data source.

20. The non-transitory computer-readable medium of claim 19, wherein at least one of the data-source offset or the data-source length is chunk-aligned.

21. The non-transitory computer-readable medium of claim 16, further comprising:
receiving a second recipe comprising a second data-source task specifying use of the data source; and
generating a second clip including parsing the second recipe, wherein the parsing the second recipe comprises extracting one or more second slices of data from the data source based on the second data-source task.

22. The non-transitory computer-readable medium of claim 16, wherein at least part of the clip is formatted using a media-container format.

23. A system, comprising:
means for storing comprising a plurality of chunks, wherein each chunk of the plurality of chunks is configured to store a predetermined positive number of bytes of data;
means for receiving a recipe comprising one or more tasks for generating a clip comprising at least one of audio or video;
means for generating the clip based on parsing the recipe, wherein the parsing the recipe comprises:
determining whether a given task of the one or more tasks is a data-source task, and
in response to determining that the given task is a data-source task:
determining one or more slices of data from a data source specified in the data-source task, wherein the data source comprises a video data source or a combined video and audio data source,
for each slice of the one or more slices of data, specifying a slice value, wherein respective slice values comprise slice lengths and slice offsets, wherein a slice of the one or more slices of data has a slice length and a slice offset specified such that an end address of the slice of data corresponds to an end address of a chunk of the plurality of chunks, and
adding the one or more slices of data to the clip; and
means for transmitting the clip to a device.

24. The system of claim 23, wherein the parsing the recipe further comprises:
in response to determining that the given task is not the data-source task, determining whether the given task is a raw-data task; and
in response to determining that the given task is the raw-data task, extracting one or more elements of fixed data from the raw-data task and adding the one or more elements of fixed data to the clip.

25. The system of claim 23, wherein the parsing the recipe further comprises:
in response to determining that the given task is not a data-source task, determining whether the given task is a dynamic-data task; and
in response to determining that the given task is the dynamic-data task, generating one or more elements of data based on a task-parameter of the dynamic-data task and adding the one or more elements of data to the clip.

26. The system of claim 23, wherein the adding the one or more slices of data comprise:
scanning the data-source task for a slice definition comprising a data-source offset and a data-source length; and
extracting a number of bytes equal to the data-source length, beginning at the data-source offset, from the data source.

27. The system of claim 26, wherein at least one of the data-source offset or the data-source length is chunk-aligned.

28. The system of claim 23, wherein:
the means for receiving receives a second recipe comprising a second data-source task specifying use of the data source; and
the means for generating generates a second clip including parsing the second recipe, wherein the parsing the second recipe comprises extracting one or more second slices of data from the data source based on the second data-source task.

29. The system of claim 23, wherein at least part of the clip is formatted using a media-container format.

* * * * *